Figure 1:
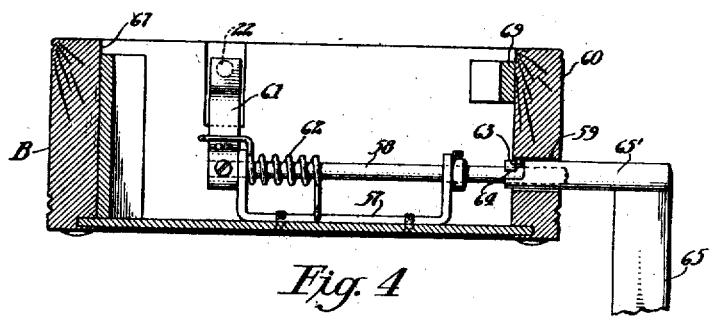

Feb. 19, 1924. 1,484,217
M. HEMLEB
ELECTRIC SEWING MACHINE
Filed May 9, 1921 4 Sheets-Sheet 1

Feb. 19, 1924.

M. HEMLEB

ELECTRIC SEWING MACHINE

Filed May 9, 1921

1,484,217

4 Sheets-Sheet 2

Feb. 19, 1924.
M. HEMLEB
ELECTRIC SEWING MACHINE
Filed May 9, 1921
1,484,217
4 Sheets-Sheet 3

WITNESSES:

INVENTOR

BY

ATTORNEY

Feb. 19, 1924.

M. HEMLEB

ELECTRIC SEWING MACHINE

Filed May 9, 1921

1,484,217

4 Sheets-Sheet 4

WITNESSES:
Adrian DeMan
John F. Heine

INVENTOR
Martin Hemleb
BY Henry J Miller
ATTORNEY

Patented Feb. 19, 1924.

1,484,217

UNITED STATES PATENT OFFICE.

MARTIN HEMLEB, OF ELIZABETH, NEW JERSEY, ASSIGNOR TO THE SINGER MANUFACTURING COMPANY, OF ELIZABETH, NEW JERSEY, A CORPORATION OF NEW JERSEY.

ELECTRIC SEWING MACHINE.

Application filed May 9, 1921. Serial No. 467,835.

*To all whom it may concern:*

Be it known that I, MARTIN HEMLEB, a citizen of the United States, residing at Elizabeth, in the county of Union and State of New Jersey, have invented certain new and useful Improvements in Electric Sewing Machines, of which the following is a specification, reference being had therein to the accompanying drawings.

This invention relates to sewing machines and has for an object to provide a self-contained electrically driven, electrically controlled and electrically lighted sewing-head including the essential accessories and adapted for reception, as a unit, within the sewing-head receiving aperture of the usual support, such as a "drop-head" cabinet or the hollow base member of the usual hand-carrying case; it being desired to conceal the electrical connections and avoid the installation in the support or cabinet of the electrical accessories and distributing circuits and connections between the main or supply circuit and the motor, motor-controller and lighting device, as such accessories, circuits and connections are comparatively troublesome and expensive to install in the supporting base or cabinet.

A further object of the invention is to provide an improved and simplified form of knee-shift control for the driving motor whereby, preferably, the operative train of connections from the knee-shift to the motor-controller will be established by the mere act of placing the sewing head unit in operative position upon its support either a drop-head cabinet or portable base and without special attention on the part of the operator.

A further object of the invention is to provide a knee-shift mechanism particularly adapted for use in connection with a sewing head having a built-in motor-controller and adapted for reception by the usual portable base or "drop-head" cabinet.

The invention further contemplates the provision of a safety device, whereby the knee-shift can be operated to start the motor only when the sewing head is in sewing position on its support.

With the foregoing and other objects in view, as will hereinafter appear, the sewing-head in which the stitch-forming and feeding mechanisms are incorporated, has mounted thereon a driving motor together with its accessories and associated devices, such as the motor-controller, wiring and terminals facilitating interconnection of the circuits and their connection with the source of electrical energy. If the machine is equipped with an electric light it, also, is mounted on the sewing-head and the lighting circuit is connected in multiple with the motor or power circuit to the main terminals on the sewing-head, so that the light will give constant illumination regardless of variations in the speed of the driving motor.

The electrical connections or power and lighting circuits are preferably extended within the hollow bed and bracket-arm of the sewing machine frame. The motor-controller is preferably contained within a housing below the sewing machine cloth-plate and is adapted to be operated by means of a train of connections with a knee-shift mounted on the sewing-head support. This train of connections includes a pair of co-acting elements, one of which is carried by the sewing-head and the other of which is carried by the support for the sewing-head; said elements being cooperatively related or "in register" only when the sewing-head occupies sewing position on its support. If the sewing-head is stationed upon a support of the "drop-head" cabinet type, the coacting elements will register only when the head is in elevated position and will be thrown out of register when the head is dropped into the cavity of the cabinet, thereby interrupting the train of connections between the knee-shift and the motor-controller and rendering the former ineffective to start the motor.

The knee-shift mechanism preferably comprises a rock-shaft mounted on the support for the sewing-head and carrying a depending knee-shift arm and an upstanding tappet-arm adapted to press against one end of a push-rod mounted in the frame of the sewing-head and connected to the swinging contact arm of the motor-controller.

Figure 2:
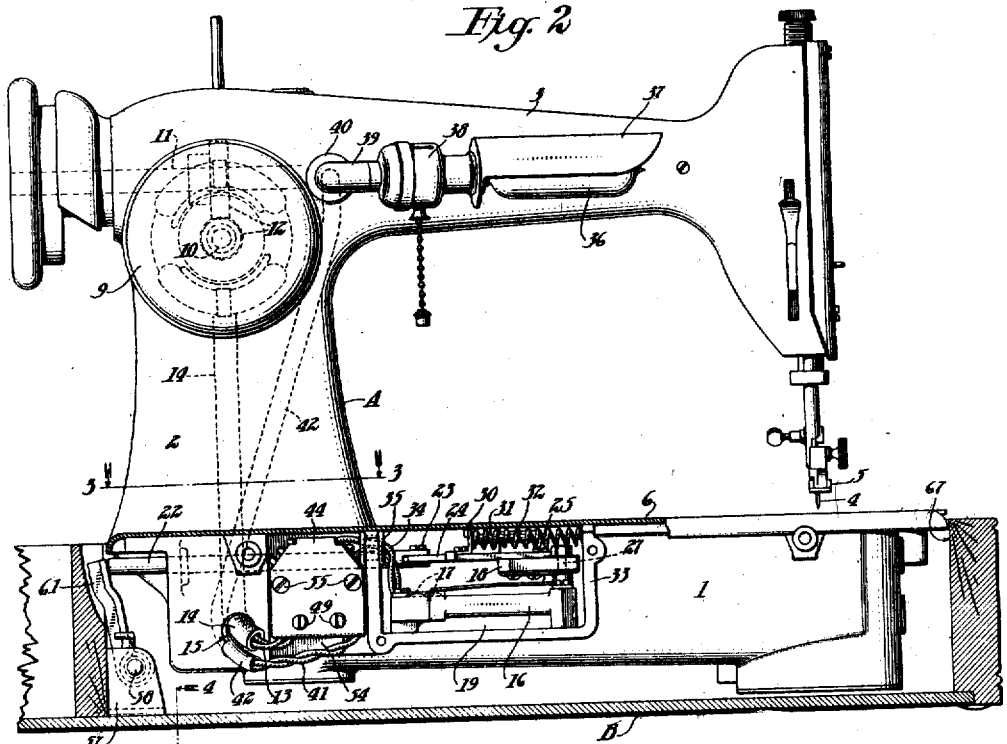
Figure 3:
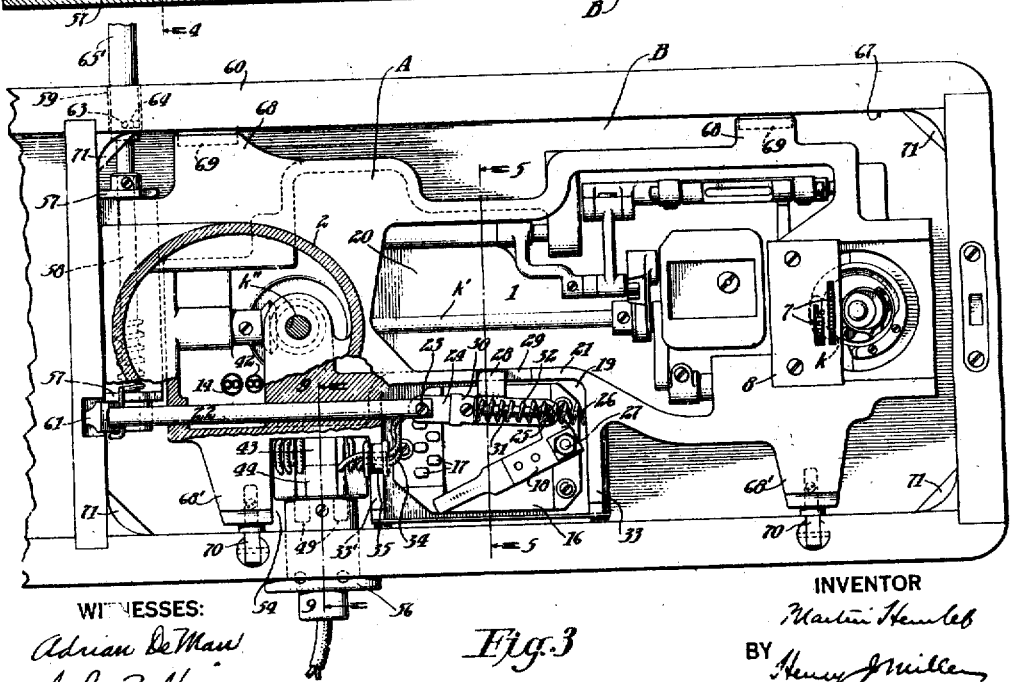
Figures 6, 7, 8:
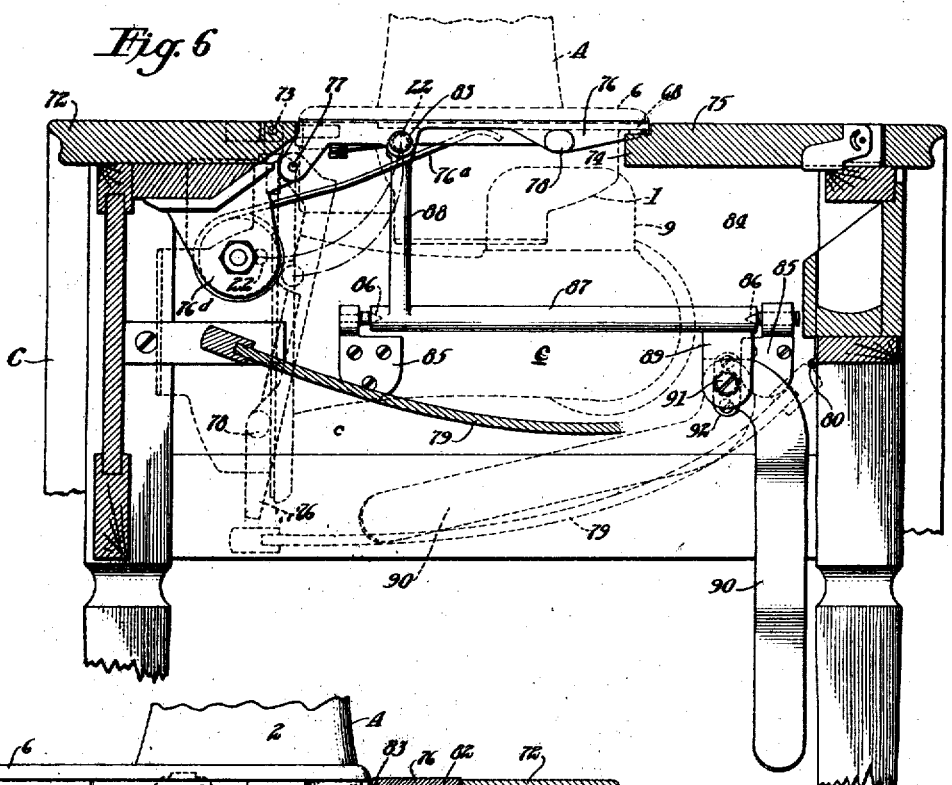
Figure 9:
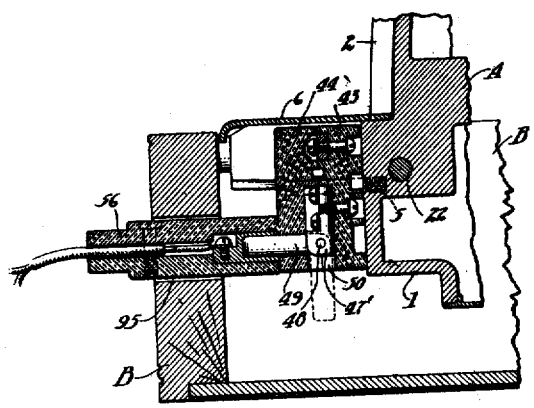
Figure 10:
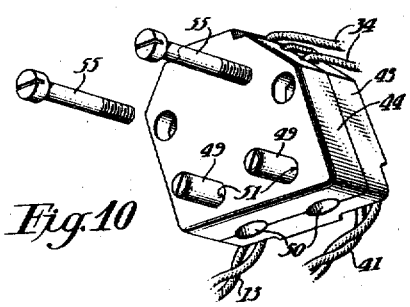
Figure 12:
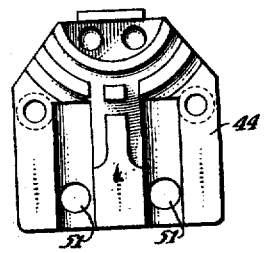
Figure 11:
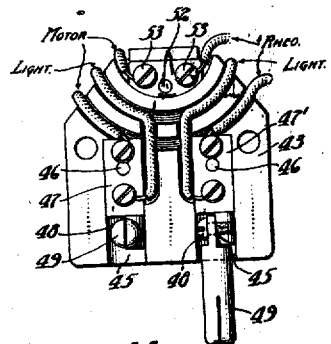
Figure 13:
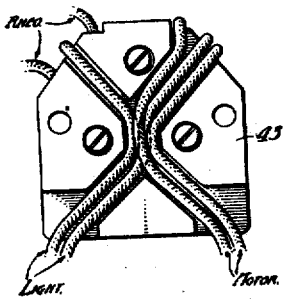

In the accompanying drawings, Fig. 1 is a front side elevation of a portable sewing machine outfit embodying the invention. Fig. 2 is a rear side elevation of the same. Fig. 3 is a horizontal section on the line 3—3, Fig. 2, the sewing-head cloth-plate having been removed to show the working parts therebelow. Fig. 4 is a transverse vertical section through the sewing-head support or base member only of the carrying case, in a plane indicated by the line 4—4, Fig. 2. Fig. 5 is a transverse section through the machine bed. Fig. 6 is a transverse sectional view of a drop-head cabinet outfit embodying the invention, and including the sewing-head illustrated in Figs. 1, 2, 3 and 5. Fig. 7 is a fragmentary front elevation, partly in section, of the outfit shown in Fig. 6. Fig. 8 is a fragmentary bottom plan view of the so-called "lifting plate" shown in Figs. 6 and 7. Fig. 9 is a transverse fragmentary vertical section on the line 9—9, Fig. 3. Fig. 10 is a perspective view of the distributing block carried by the sewing-head as shown in Figs. 1, 2, 3 and 7. Figs. 11 and 12 are inner face views of the base- and cover-members of the block and Fig. 13 is a view of the rearward face of the base-member of the block.

In the preferred embodiment of the invention chosen for the purpose of the present disclosure and illustrated in the accompanying drawings, A represents the complete sewing-head including the machine frame constructed preferably in substantial accordance with the disclosure of the patent to Dosch et al., No. 1,304,750, of May 27, 1919, and formed with a hollow trough-shaped bed 1, from one end of which rises the hollow standard 2 of the bracket-arm 3 at the free end of which are journaled the usual needle- and presser-bars carrying respectively the reciprocating needle 4 and presser-foot 5. The open top of the hollow bed 1 is closed by the detachable rectangular cloth-plate 6, below the level of which and within the trough is located the rotary hook $k$ and its driving shaft $k'$. Also incorporated in the frame of the sewing-head within the trough-shaped bed 1 and actuated by the shaft $k'$ is the feeding mechanism including the four-motion feed-dog 7 which operates through the usual slotted throat-plate 8. The driving connections for the stitch-forming and feeding mechanisms are preferably constructed substantially in accordance with the disclosure of said Dosch et al. patent and need not be more specifically referred to.

The sewing head A includes a driving motor 9 which is preferably of the built-in, unitarily removable construction disclosed in the patent to Dosch et al., No. 1,311,114, of July 22, 1919; the motor shaft 10 extending transversely of the main-shaft 11 of the sewing-head and being connected to the latter by means of the spiral gears 12. The main-shaft 11 is connected to the lower shaft $k'$ by means of suitable bevel-gear connections with the intermediate shaft $k''$. The motor lead-wires 13 are preferably enclosed within the protective covering or conduit 14 which extends downwardly from the motor 9 within the hollow standard 2 and out through the aperture 15 in the rear side wall of the bed 1 below the level of the cloth-plate 6.

The sewing-head A further comprises a motor-controller preferably in the form of a rheostat including the resistor 16 carrying the usual contact points 17 and pivoted contact arm 18 adapted to play over the points 17 to vary the resistance in the motor circuit; the controller being preferably built into the trough-shaped bed 1 by forming the latter with an open-topped compartment 19 which is separated from the main compartment 20 of the bed 1 by means of the wall or partition 21, as disclosed in my Patent No. 1,409,951, of March 21, 1922.

Unlike the disclosure of my said copending application, the present motor-controller is adapted to be operated by a knee-shift lever and, to this end, the bed 1 is preferably formed with suitable bearings for a horizontal push-rod 22, Figs. 2 and 3, the inner end of which extends into the controller compartment 19 and is pivotally connected at 23 to one end of a link-bar 24 the other end of which is pivoted at 25 to the right angular extension 26 of the contact-arm 18 which is pivotally mounted at 27 on the resistor 16. The link 24 is formed with a laterally and forwardly offset extension or lip 28 which rests in the guide-slot 29 in the upper edge of the wall 21; the cloth-plate 6 forming the upper wall of such guide-slots, as shown in Fig. 5. The lip 28 and guide-slot 29 serve to steady the link 24 and overcome any tendency of the latter to twist or turn out of a horizontal position and thus cramp the pivotal connections. Mounted on the link 24 is a bracket 30 carrying the pin 31 which supports the coil spring 32 in a position directly above and parallel to the link 24. One end of the spring 32 abuts against the bracket 30 and the other end against one end wall 33 of the controller compartment 19, whereby the spring serves to urge the contact arm 18 to its "off" position shown in Fig. 3. The outer end of the push-rod 22 projects exteriorly of the bed 1, at the base of the standard 2, below the level of the cloth-plate 6 and is adapted to be actuated by a tappet-arm connected with a knee-shift device which will be hereinafter described.

The rheostat connections or lead-wires 34 pass out of the compartment 19 through an aperture in the wall 33' of the latter, Fig. 3, fitted with an insulating bushing 35 located at the base of the standard 2 below the level of the cloth-plate 6 and in relatively close proximity to the aperture 15 through which the motor-leads 13 emerge from the frame.

Still further, the sewing head unit A preferably includes a lighting device which may be constructed and built into the frame of the sewing-head in the manner disclosed in the application of F. Diehl, Serial No. 453,786, filed March 19, 1921. The lighting device may thus comprise a lamp-bulb 36 and reflector 37 carried by the pull-socket 38 secured to one limb of an elbow 39, the other limb of which is fitted to an apertured seat 40 formed on the bracket-arm 3. The lighting-circuit 41 extends from the socket 38 through the elbow 39 and apertured seat 40 into the interior of the bracket-arm 3, thence downwardly within the conduit 42 within the standard 2 and out through the aperture 15 alongside the power or motor wires 13.

The power and lighting circuits have thus been brought from various points within the hollow frame of the sewing-head A, to outlets located relatively close together at the base of the standard 2 below the cloth-plate 6, so as to be invisible when the machine is in operative position on its support. In order to take care of the proper connection of these circuits in a neat and efficient manner, as well as to provide for a supply of electric current, I preferably provide the sewing-head with a suitable distributing block which is preferably constructed as shown in Figs. 9 to 13 inclusive and comprises the base- and cover-members 43 and 44, respectively, having their meeting faces similarly grooved as shown in Figs. 11 and 12. Mounted in the parallel, longitudinal grooves 45 in the base-member 43 of the block, by means of screws 46, are the terminals 47, 47' to the lower ends of which are pivotally secured by screws 48, the slitted terminal plugs 49 which may be swung about the screws 48 as pivots so as to project outwardly through either the end apertures 50 or the side apertures 51 in the cover-member 44. At the upper end of the base-member 43 is mounted the plate 52 provided with terminal screws 53, 53 by which a motor-wire and a rheostat-wire, respectively are joined together. The remaining motor-wire is connected to one of the terminal plates 47 and the remaining rheostat wire is connected to the remaining terminal plate 47', whereby the motor and rheostat are connected in series to the current supply terminals. The lighting wires are laid in suitable grooves in the meeting faces of the blocks 43, 44, as shown in Fig. 11, and are connected to the terminals 47, 47' in multiple with the power circuit. The rearward face of the base member 43 of the block is formed with X-shaped grooving in which the power and lighting wires are confined and protected as illustrated in Fig. 13. The base- and cover-members of the block are held together and are secured in a recess 54 intermediate the apertures 15 and 35 in the bed 1 of the sewing-head A by means of screws 55. The electric current may be supplied to the plug terminals 49 by means of the usual flexible twin-conductor cord terminating in a socketed member 56 adapted to fit over the plug terminals 49.

The sewing head A, as described, is adapted to be removably stationed, as a unit, on an apertured support in the form of either the hollow-base member B of the usual hand carrying case, or a "drop-head" cabinet C. When placed on the base B to form a portable outfit, such base preferably has mounted within it a bracket 57 affording bearings for a horizontal rock-shaft 58 disposed transversely of the base B and in line with an aperture 59 in the front wall 60 thereof. Secured to the inner end of the rock-shaft 58 is an upstanding tappet-arm 61, the upper end of which registers with and is adapted to strike the outer end of the push-rod 22 and force the latter inwardly against the pressure of the spring 32, to shift the controller-arm 18 over the contact points 17. A spring 62 surrounding the rock-shaft 58 and at its opposite ends anchored, respectively, to the tappet-arm 61 and bracket 57, serves to urge the tappet-arm 61 away from the push-rod 22.

The rock-shaft 58 is provided at its front end with a transverse pin 63 which is received within the L-shaped slot 64 in the socketed hub 65' at the upper end of the knee-shift lever-arm 65 which hangs downwardly over the front edge of the table 66 to a position within reach of the operator's knee; the present arrangement and mode of operation of the knee-shift lever being similar in principle to that disclosed in my copending application Serial No. 380,728, filed May 12, 1920. When stationed on the portable base B, the bed 1 and cloth-plate 6 are received by the rectangular aperture 67, Fig. 3, and the cloth-plate 6 fits within said aperture, as shown in Fig. 2. The sewing-head is supported by means of the laterally extending lugs 68, 68', the former of which rest upon the ledges 69 and the latter of which receive the usual hinge pins 70. The corners of the cloth-plate 6 may also rest upon the corner ledges 71, Fig. 3, although in the present instance the cloth-plate is made of relatively thin sheet-metal and is not intended to sustain the weight of the sewing-head; the supporting lugs 68, 68' being designed primarily for this purpose.

The sewing-head A is also adapted to be received within the apertured top of the usual drop-head cabinet C; it being preferred to use a cabinet having the general features of construction disclosed in the U. S. patent to Kopf et al., No. 1,349,678, of August 17, 1920. The means incorporated in the cabinet for supporting the sewing-head A so that it may be swung or dropped into the cavity c below the cabinet top 72 are preferably constructed substantially in accordance with the disclosure in the U. S. patent to Diehl et al., No. 541,474, of June 25, 1895; the rear side of the sewing machine bed being hinged to the cabinet top at 73 and the front side or lugs 68 resting upon the lip 74 of the hinged leaf 75.

When the machine is to be dropped within the cavity $c$, the head A and the leaf 75 are first lifted about their respective hinges to carry the lip 74 out of range of the front edge of the cloth-plate or supporting lug members 68 of the sewing machine bed, whereupon the head A may be lowered into the cavity $c$. The cabinet is equipped with the usual lifting plate 76 hinged at 77 and having the lateral lug 78 which extends under the end of an overhanging portion of the sewing machine bed. The lifting plate 76 is urged to its horizontal or full line position, Fig. 6, by means of the usual spring $76^a$, the free end of which rests in a groove $76^b$, Fig. 8, of the lifting plate; the other end of such spring being coiled about and anchored to an arbor $76^c$, Fig. 7, carried by a bracket $76^d$ mounted within the cavity $c$ of the cabinet. The bottom of the cavity $c$ is closed by the usual apron 79 hinged at 80 and, in practice, connected by a chain, not shown, to the lifting plate 76. When the sewing-head A is in raised position, the apron 79 is raised to full line position, Fig. 6.

In accordance with the present improvement, the lifting plate is formed with bearings 81, 81, Fig. 8, for a transverse spring-pressed push-rod 82 having an enlarged head 83 let into the side of the lifting plate adjacent the sewing-head. When the sewing-head is in raised or sewing position, the push-rods 82 and 22 are in alignment, as shown in Figs. 6 and 7. Mounted on the inner face of the right-hand end-wall 84 of the cabinet C are the brackets 85, 85 fitted with trunnions 86, 86 for the rock-shaft 87 which is formed in its rearward end with an upstanding tappet-arm 88 registering with the push-rod 82 when the sewing-head A is in elevated position. The shaft 87 may be manually controlled by any of the usual expedients. Preferably the front end of the rock-shaft 87 is formed with a downwardly extending lug 89 which is slotted to receive the upper end of the knee-controlled arm 90. The arm 90 is secured within the slot in the lug 89 by means of a pivot-screw 91 and may be swung about such screw from running or full-line position, Fig. 6, to non-running or dotted line position, wherein it is substantially concealed from view; the apron 79 being cut away to avoid interference with the arm 90. Screwed to the wall 84 is the plate 92 carrying the supporting pin 93 for the spring 94 which urges the knee-shift arm 90 to "off" or full-line position, Fig. 7. It will be observed that when the sewing-head A is dropped within the cavity $c$, the rods 82 and 22 are carried out of range of the tappet-arm 88 and accidental pressure upon the knee-shift lever will not cause the driving motor to start.

When the sewing-head A is to be used with a portable outfit, the distributing block 43, 44 is adjusted with its terminals 49 projecting horizontally as shown in Figs. 9 and 10, so as to be accessible to the current-supply socketed member 56 which may be passed through an aperture 95, Fig. 9, in the rear wall of the base B. When the head A is to be used in a drop-head cabinet, the terminals 49 are set in a vertical position, as shown in dotted lines in Fig. 9; the cover 44 having first been removed. In this position they are readily accessible to the current supply circuit 95' which may comprise the usual twin conductor cord and the socketed connectors 95 which may be readily slipped over the plug terminals 49 and may remain connected thereto whether the sewing-head occupies raised or lowered position. The main or supply circuit 94 may, in accordance with the customary practice be made up of one or more disconnectible sections or extensions, as desired.

It will be evident that the sewing-head may be put away without disconnection of the supply cord from the usual wall receptacle or socket; the described safety device preventing starting of the motor should the knee-shift be accidentally manipulated. When the machine is to be used, the operator has nothing to do but raise the sewing-head to operative position, turn on the light and begin work; it being unnecessary to make any electrical connections or rearrange or adjust any of the operative parts of the electrical equipment.

While I have shown and described one or more preferred embodiments of the invention, it is to be understood that the invention is not limited to the details of construction and arrangement of parts shown and described. Such details and arrangements may obviously be materially modified within the spirit of the invention and scope of the appended claims.

Having thus set forth the nature of the invention, what I claim herein is—

1. A motor driven sewing-head adapted for reception by a portable base or drop-head cabinet and comprising a frame, stitch-forming and feeding mechanisms incorporated in said frame, a driving motor and a motor-controller carried by said frame, and a shiftable controller operating element carried by said frame, said element being adapted to register with a coacting manually controlled element carried by the support by which the sewing-head is received.

2. A motor driven sewing-head adapted for reception by a portable base or drop-head cabinet and comprising a frame and flat rectangular cloth-plate, stitch-forming and feeding mechanism incorporated in said frame, a driving motor and motor-controller carried by said frame and a shiftable controller operating element exposed exteriorly of the frame, below and within the area of the cloth-plate, said element being adapted to register with a coacting manually controlled element carried by the support by which the sewing-head is received.

3. The combination with stitch-forming mechanism, a driving motor, a motor-controller and a frame carrying said mechanism, motor and controller, of an apertured support for removably receiving said frame and supported parts as a unit, said support having a knee-shift incorporated therein and connections for operating said motor-controller, said connections being rendered inoperative to start the driving motor when said frame is shifted out of normal operative position on its support.

4. The combination with an electrically driven sewing-head including, stitch-forming mechanism, a driving motor, motor-controller, and a frame carrying said mechanism, motor and controller, of an apertured support for removably receiving said sewing-head as a unit, said support having a knee-shift incorporated therein, and connections between said knee-shift and controller including a pair of coacting elements carried respectively by the sewing head and its support and adapted to register with one another only when the sewing-head occupies proper sewing position on its support.

5. The combination with an electrically driven sewing-head including, stitch-forming mechanism, a driving motor, a motor-controller and a frame carrying said mechanism, motor and controller, of a drop-head cabinet for removably receiving said sewing-head as a unit, said cabinet support including a spring-pressed lifting plate, a knee-shift incorporated in said cabinet and connections for operating said controller, said connections including a tappet-arm pivotally mounted within the cabinet and a push-rod slidably carried by the lifting plate and disposed in the path of movement of the tappet-arm when the lifting plate is in elevated position.

6. An electrically driven sewing machine adapted for reception by the usual apertured cabinet or supporting base and comprising a frame including a bed and bracket-arm, a cloth-plate adapted to fit substantially flush with the top of the cabinet or portable base, a motor-controller including a shiftable controller arm, and manually controlled means for operating said controller arm, said means including a horizontal slide rod journaled in and longitudinally of the bed of the sewing machine frame below the cloth-plate and connected to said arm.

7. The combination with an apertured support, of a sewing-head including a cloth-plate let into said support, a driving motor for the sewing-head, a motor-controller, and controller operating means including a slide-rod mounted in the frame of the sewing-head, and a manually operated tappet-arm mounted in the support for the sewing head and adapted to register with the slide-rod when the sewing-head is in operative position on its support.

8. The combination with a hollow sewing machine frame including a hollow trough-shaped bed and a cloth-plate, of a plurality of electrical circuits concealed in said hollow frame, said frame being formed below the level of the cloth-plate with one or more apertures through which said circuits emerge, and a combined distributing block and plug connector mounted externally on said frame below the cloth plate and to which said circuits are connected.

9. In a sewing machine having stitch-forming mechanism and a hollow frame casting for supporting said stitch-forming mechanism, a sewing machine motor-controller built into said hollow frame casting, and operating means including a push-rod slidably mounted in and passing through a wall of said hollow frame.

10. A sewing machine comprising a frame having a hollow trough-shaped bed and an overhanging arm, stitch-forming mechanism incorporated in said frame, a sewing machine motor-controller mounted in said hollow bed, and a push-rod slidably mounted in and passing through a wall of said bed and connected to operate said controller.

In testimony whereof, I have signed my name to this specification.

MARTIN HEMLEB.